United States Patent
Mason et al.

(10) Patent No.: US 10,362,100 B2
(45) Date of Patent: *Jul. 23, 2019

(54) DETERMINING LOAD STATE OF REMOTE SYSTEMS USING DELAY AND PACKET LOSS RATE

(71) Applicant: Oath Inc., Dulles, VA (US)

(72) Inventors: Kevin E. Mason, Ashburn, VA (US); William L. White, Georgetown, CA (US); Carla A. Dunagan, Ashburn, VA (US)

(73) Assignee: Oath Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/901,237

(22) Filed: Feb. 21, 2018

(65) Prior Publication Data

US 2018/0191819 A1 Jul. 5, 2018

Related U.S. Application Data

(63) Continuation of application No. 15/211,081, filed on Jul. 15, 2016, now Pat. No. 9,936,006, which is a
(Continued)

(51) Int. Cl.
*H04L 29/08* (2006.01)
*H04L 12/801* (2013.01)
*H04L 12/26* (2006.01)

(52) U.S. Cl.
CPC .......... *H04L 67/1008* (2013.01); *H04L 43/08* (2013.01); *H04L 47/11* (2013.01);
(Continued)

(58) Field of Classification Search
CPC ....... H04L 43/08; H04L 47/11; H04L 67/322; H04L 67/1008; H04L 67/1027; H04L 67/1029
See application file for complete search history.

(56) References Cited

U.S. PATENT DOCUMENTS 6,247,058 B1 6/2001 Miller et al.
6,944,678 B2 9/2005 Lu et al.
(Continued)

OTHER PUBLICATIONS

Ali, F. et al., "The Study on Load Balancing Strategies in Distributed Computing System," International Journal of Computer Science & Engineering Survey (IJCSES), Apr. 2012, pp. 19-30, vol. 3, No. 2.
(Continued)

*Primary Examiner* — Patrice L Winder
(74) *Attorney, Agent, or Firm* — Bookoff McAndrews, PLLC

(57) ABSTRACT

Systems and methods are provided for managing workloads across multiple resources in a distributed computing system. A data traffic flow between a source device and each of a plurality of target devices within the distributed computing system is monitored. A load state of each of the plurality of target devices is determined based on the monitored data traffic flow. Upon detecting a resource constraint for at least one of the plurality of target devices, at least a portion of the data traffic flow between the source device and the resource-constrained target device is adjusted such that the device operates at a reduced load state. The data traffic flow to the particular target device may be readjusted so as to restore its load state to a default or predetermined operating level once the resource constrained has been resolved.

19 Claims, 9 Drawing Sheets

Related U.S. Application Data continuation of application No. 14/247,880, filed on Apr. 8, 2014, now Pat. No. 9,426,215.

(52) U.S. Cl.
CPC ...... *H04L 67/1027* (2013.01); *H04L 67/1029* (2013.01); *H04L 67/322* (2013.01); *H04L 43/0829* (2013.01); *H04L 43/0864* (2013.01)

(56) References Cited

U.S. PATENT DOCUMENTS

| | | | | |
|---|---|---|---|---|
| 7,254,626 | B1* | 8/2007 | Kommula | H04L 67/1008 709/217 |
| 7,693,996 | B2* | 4/2010 | Wexler | H04L 67/1002 702/186 |
| 7,934,216 | B2* | 4/2011 | Taylor | H04L 67/34 709/223 |
| 8,086,596 | B2 | 12/2011 | Bernardini et al. | |
| 8,208,380 | B1 | 6/2012 | Nachum et al. | |
| 9,094,262 | B2* | 7/2015 | Hueter | H04L 67/1034 |
| 9,106,482 | B1 | 8/2015 | Bapat et al. | |
| 9,154,455 | B1 | 10/2015 | Dropps | |
| 9,225,651 | B2* | 12/2015 | Wang | H04L 67/1029 |
| 9,766,947 | B2* | 9/2017 | Wang | G06F 9/5083 |
| 2002/0002611 | A1* | 1/2002 | Vange | H04L 67/1008 709/223 |
| 2003/0055971 | A1* | 3/2003 | Menon | H04L 67/1008 709/226 |
| 2005/0149940 | A1 | 7/2005 | Calinescu et al. | |
| 2007/0258463 | A1* | 11/2007 | Rhoades | H04L 63/1458 370/395.52 |
| 2008/0126534 | A1* | 5/2008 | Mueller | H04L 43/12 709/224 |
| 2009/0328050 | A1* | 12/2009 | Liu | G06F 9/5088 718/104 |
| 2012/0254443 | A1* | 10/2012 | Ueda | H04L 67/1008 709/226 |
| 2012/0271964 | A1 | 10/2012 | Porter | |

OTHER PUBLICATIONS

Gettys, J. et al., "Bufferbloat: Dark Buffers in the Internet," ACM QUEUE, Networks, 2011, 15 pages.

Nichols, K. et al., "Controlling Queue Delay," ACM QUEUE, Networks, 2012, 15 pages.

\* cited by examiner

DETERMINING LOAD STATE OF REMOTE SYSTEMS USING DELAY AND PACKET LOSS RATE

CROSS-REFERENCE TO RELATED APPLICATIONS

This application is a continuation of pending U.S. application Ser. No. 15/211,081, filed Jul. 15, 2016, which is a continuation of U.S. application Ser. No. 14/247,880, filed Apr. 8, 2014, now U.S. Pat. No. 9,426,215, issued on Aug. 23, 2016, all of which are incorporated by reference herein in their entireties.

TECHNICAL FIELD

The present disclosure relates generally to managing resource usage and workload allocation across a distributed computing system, and particularly to improving the management and distribution of workloads across multiple computing resources within a distributed computing system.

BACKGROUND

Advancements in computing and network technologies now allow users to access different types of online content and services from almost any geographic location through a web browser or other client application installed at their respective computing devices. For example, a web service may be provided to user devices over the Internet by multiple computing devices operating within a data center or distributed computing system. Such computing devices may include, but are not limited to, servers, storage devices, routers, gateways, and other types of networked computing devices, which may be distributed across a local or wide area network associated with a particular service provider.

A distributed computing system often encounters performance bottlenecks and scalability problems that may prevent the system from effectively controlling resource usage by managing workloads distributed across multiple computing devices within the system. A distributed computing system may employ a hardware or software load balancer to monitor system resources and manage workloads distributed across the various computing devices within the system. For example, such a load balancer may be used to receive incoming requests from different clients or end users of a web service and distribute multiple data packets related to the received requests for processing by different back-end servers within the system. Further, the load balancer may be used to determine the load state of each remote back-end server device used to process data packets based on measurements of resource usage at that particular server. Such measurements may include, but are not limited to, central processing unit (CPU) usage, memory usage, bandwidth, input/output (I/O) or other back-end resource limits. Starvation of any one or combination of these resources may cause a server within the system to reach an "unhealthy" load state, in which the server is unable to effectively handle its current workload due to one or more resource constraints. Thus, the load balancer may use various load balancing techniques to identify the resource-constrained server within the system and transfer at least a part of the workload from that server to a different server that has sufficient resources to handle the transferred workload.

However, conventional load balancing techniques may lead to inaccurate measurements and scalability problems, particularly when multiple load balancers are employed within the system. Such conventional techniques generally use either in-band or out-of-band health checks of specific devices within the system to identify potential resource constraints. In-band health checks generally involve checking the load state or health of each device in the system on a periodic basis. To prevent false positives, multiple health checks, seconds apart, must fail before the load state of a device within the system is determined to be unhealthy. However, this may prevent the load balancer from identifying certain devices that have an actual resource constraint, particularly those having resources that are constrained by only a marginal amount. Since such marginally constrained devices may alternately pass and fail successive health checks, the failed health checks may not be consistent enough to indicate a problem to the load balancer. Moreover, when an actual problem does exist, significant system delays induced by the need to fail multiple checks may cause connection problems and a large number of data packets to be dropped.

Out-of-band checks generally involve polling each device at some predetermined time interval. Consequently, such out-of-band polling techniques typically provide only a snapshot of a device's load state or an average of the resource usage at the device between polling intervals. However, the data produced by such out-of-band checks may not reveal when the device's resource usage is in an overloaded or idle state of operation, since significant spikes or sags in resource usage may be missed or excluded as the resulting data is averaged out over time. Further, such out-of-band checks may require additional overhead in the form of custom thresholds and measurements in order to correctly identify and measure resource constraints for each type of device and traffic pattern.

The problems associated with the aforementioned in-band and out-of-band load balancing techniques may be exacerbated by the use of multiple load balancers that share the same set of back-end servers. Each load balancer in such a system may be aware of only the amount of data traffic it sends to a given back-end server, without having any knowledge of the amount of data being sent by other load balancers within the system. This may result in a "bell ringing" effect, in which traffic from multiple load balancers converges on the same back-end server, thereby overwhelming the server's resources and causing it to fail the health checks performed by each load balancer. The load balancers may then shift traffic away from the failed server and overwhelm another back-end server. These traffic shifts may continue until a sufficient number of back-end servers are available or the system's workload drops to a level that is sufficient to alleviate resource constraints and prevent the back-end servers from becoming overloaded any further.

SUMMARY OF THE DISCLOSURE

Embodiments disclose systems and methods for managing workloads across multiple resources in a distributed computing system.

According to certain embodiments, computer-implemented methods are disclosed for managing workloads across multiple resources in a distributed computing system. One exemplary method includes: monitoring a data traffic flow between a source device and each of a plurality of target devices via a network; determining a load state of each of the plurality of target devices based on the monitored data traffic flow; detecting a resource constraint for a first target device in the plurality of target devices, based on the load state determined for the first target device; adjusting at least a portion of the data traffic flow between the source device and the first target device such that the first target device operates at a reduced load state; and upon determining that the first target device no longer has the resource constraint while operating at the reduced load state, readjusting the data traffic flow between the source device and the first target device so as to restore the load state of the first target device to a default or predetermined operating level that is above the reduced load state.

Another exemplary method for managing workloads across multiple resources in a distributed computing system includes: monitoring a data flow between a source device and each of a plurality of target devices via a network; responsive to receiving an indication of a resource constraint for a first target device in the plurality of target devices, determining whether a load state of the first target device exceeds a predetermined threshold/maximum capacity based on the monitored data flow between the source device and the first target device; upon determining that the load state of the first target device exceeds the predetermined threshold capacity, adjusting at least a portion of the data flow between the source device and the first target device so as to reduce the load state of the first target device; determining a new load state of the first target device based on the adjusted data traffic flow; and upon determining that the new load state indicates that the first target device no longer has the resource constraint, readjusting the data traffic flow between the source device and the first target device so as to increase the load state of the first target device to at least a predetermined operating/minimum capacity.

An exemplary system for balancing workloads across multiple resources in a distributed computing environment includes a memory having processor-readable instructions stored therein; and a processor configured to access the memory and execute the processor-readable instructions, which when executed by the processor configures the processor to perform a plurality of functions, including functions to: monitor a data traffic flow between a source device and each of a plurality of target devices via a network; determine a load state of each of the plurality of target devices based on the monitored data traffic flow; detect a resource constraint for a first target device in the plurality of target devices, based on the load state determined for the first target device; adjust at least a portion of the data traffic flow between the source device and the first target device such that the first target device operates at a reduced load state; determine that the first target device no longer has the resource constraint while operating at the reduced load state; and readjust the data traffic flow between the source device and the first target device so as to restore the load state of the first target device to a default or predetermined operating level that is above the reduced load state, based upon the determination.

According to certain embodiments, systems are disclosed for managing workloads across multiple resources in a distributed computing system. One system includes a memory having processor-readable instructions stored therein; and a processor configured to access the memory and execute the processor-readable instructions, which when executed by the processor configures the processor to perform a plurality of functions, including functions to: monitor a data traffic flow between a source device and each of a plurality of target devices via a network; determine a load state of each of the plurality of target devices based on the monitored data traffic flow; detect a resource constraint for a first target device in the plurality of target devices, based on the load state determined for the first target device; adjust at least a portion of the data traffic flow between the source device and the first target device such that the first target device operates at a reduced load state; determine that the first target device no longer has the resource constraint while operating at the reduced load state; and readjust the data traffic flow between the source device and the first target device so as to restore the load state of the first target device to a default or predetermined operating level that is above the reduced load state, based upon the determination.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Figure 1A:
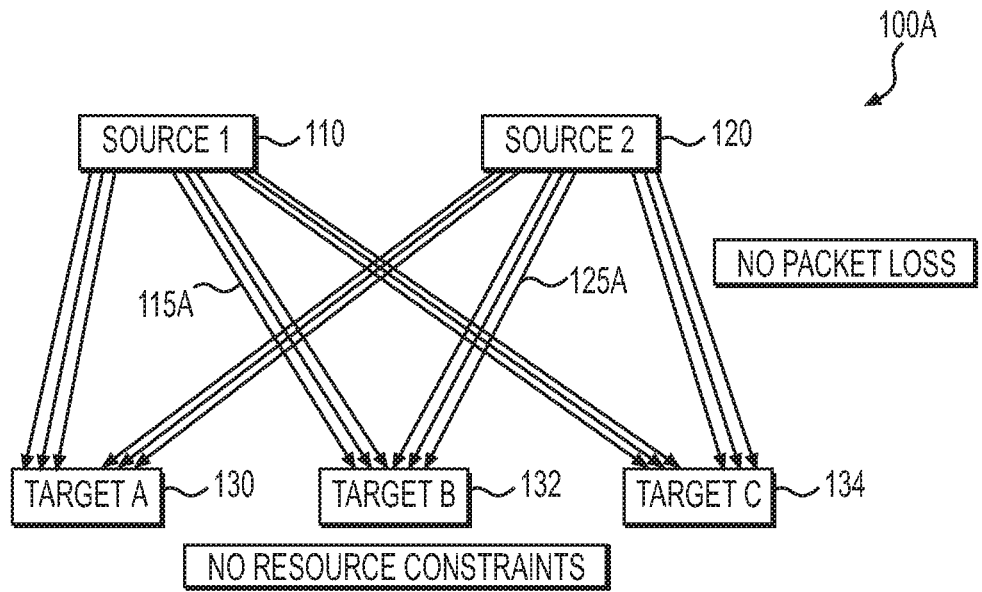
FIGS. 1A-1E illustrate an example of managing workloads across multiple resources in a distributed computing system by adjusting data traffic flows between multiple data sources and targets within the system.

The present disclosure is directed to overcoming one or more of the above referenced issues. Specifically, the present disclosure is directed to managing the distribution of workloads across multiple resources in a distributed computing system. In an example, the resources within such a distributed computing system may include a plurality of target devices that are used to process tasks or job requests initiated by a client of an application or service provided by the distributed computing system. The distributed computing system may also include one or more source devices (or "sources") for distributing workloads and managing resource usage across the various target devices (or "targets") within the system. The target devices may include, for example, different back-end servers of a data center or clustered computing system, and the source devices may be one or more load balancers within the system. However, it should be noted that target devices and source devices are not limited thereto and may include other types of computing resources within the system including, for example, databases or other data storage devices.

As will be described in further detail below, each source device or load balancer within a data center or distributed computing system may be configured to monitor a data traffic flow to each target device. The monitored data traffic flow may be used to determine whether a target's load state remains healthy, i.e., the target does not have any resource constraints while operating under its current workload. A target's load state may be determined using performance measurements calculated based on various metrics obtained by monitoring the data traffic flow to the target. Examples of various performance metrics that may be tracked for each target include, but are not limited to, target response time, packet delay, or network latency, e.g., based on the average or maximum round-trip time (RTT) for data packets sent to the target, and the data packet loss rate (PLR).

In an embodiment of the present disclosure, each target uses a head drop scheme for dropping packets from its data buffer queue or network stack. In contrast with conventional methods that rely on a tail drop scheme, where packets are dropped from the tail or back of the queue, the dropped packets are from the head or front of the queue. Also, in contrast with conventional methods, packets may be dropped by each target after a predetermined period of time (e.g., a threshold waiting time) has elapsed and before the target's data buffer queue is actually full. This allows each target to provide an early indication of a resource constraint that may be causing processing delays and packets to wait in the queue for relatively long periods of time. For example, the dropped packet can be detected by a source device in near real-time and without having to wait for the entire queue of the target to be full before a packet is dropped (as in tail drop). By receiving timely notice of the resource constraint, the source device can start load balancing techniques to mitigate or resolve the detected resource constraint sooner, e.g., by moving all or a portion of the data traffic flow away from the target in question to other target devices that may be available and have sufficient capacity to handle the additional load within the distributed system.

The term "data traffic flow" is used herein to refer to one or more data pathways or links between a source device or data source (e.g., a load balancer) and a target device (e.g., a back-end server). Each data pathway or "data flow" may be used by a source device within a distributed computing system to transmit load units (e.g., data packets) to a target device in the system for processing. Each load unit or data packet may correspond to a discrete task for performing a particular function provided by an application or service implemented using the distributed computing system.

While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

It should also be appreciated that the present disclosure, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Reference will now be made in detail to the exemplary embodiments of the disclosure, examples of which are illustrated in the accompanying drawings. Wherever possible, the same reference numbers will be used throughout the drawings to refer to the same or like parts.

FIGS. 1A-1E are data flow diagrams 100A-100E illustrating an exemplary process for adjusting a data traffic flow between a source device and a target device within a distributed computing system in order to relieve resource constraints detected for the target device. In the example shown in FIGS. 1A-1E, the distributed computing system includes a source device 110 and a source device 120, each of which provide a data traffic flow to a target device 130, a target device 132, and a target device 134. Source devices 110 and 120 and target devices 130, 132, and 134 may be communicatively coupled to each other via a local area, medium area, or wide area network, such as the Internet. In an embodiment, source devices 110, 120 and target devices 130, 132, and 134 may be part of a private network of an enterprise. Source devices 110, 120 and target devices 130, 132, and 134 may be located within, for example, a particular data center or clustered computing system of the enterprise network. Alternatively, source devices 110, 120 and target devices 130, 132, and 134 may be geographically distributed across a wide area network of the enterprise. In another alternative embodiment, source devices 110, 120 and target devices 130, 132, and 134 may be part of a virtual system environment where each of the devices is a virtual machine ("VM") interconnected to each other via a virtual network. However, it should be noted that the techniques described herein are not intended to be limited to the distributed computing system shown in FIGS. 1A-1E and that these techniques may be applied to any type of distributed computing system including any number of source devices or target devices, as desired for a particular implementation.

The distributed computing system in this example, including source devices 110 and 120 along with target devices 130, 132, and 134, may be part of, for example, a data processing center for processing requests and responses to and from clients of an application or service provided by an online service provider associated with the distributed computing system. Accordingly, target devices 130, 132, and 134 may be back-end servers of the distributed computing system, and each of source devices 110 and 120 may be implemented as hardware or software load balancers that receive requests from one or more clients (not shown) via an electronic communication network, such as the Internet. Alternatively, target devices 130, 132, and 134 and source devices 110 and 120 may be part of a virtual system environment where each of the devices is a VM interconnected to each other via a virtual network. The received requests may be forwarded by source devices 110 and 120 to one or more of target devices 130, 132, and 134 for processing. As will be described in further detail below, source devices 110 and 120 may also monitor the data traffic flowing to each target device in order to detect any resource constraints for any of target devices 130, 132, and 134 and thereby, determine that one or more targets within the system may be operating in an unhealthy state.

In an embodiment, the network is a packet-switched network, and the requests and data traffic flowing between each of the source and target devices are in the form of data packets, e.g., data packets formatted according to the Transmission Control Protocol (TCP) of the Internet Protocol (IP) suite. Each of target devices 130, 132, and 134 may maintain a data buffer or network stack for receiving and temporarily storing data packets received from source devices 110 and/or 120. Such a data buffer may be, for example, a dedicated area within a memory of each target device. In an example, the data packets received from each source device may be stored in a separate data buffer or queue allocated within a target device's memory for that particular source device. Alternatively, each target device may maintain a single data buffer or stack for storing (or queuing) data packets received from either of source devices 110 or 120. Further, target devices 130, 132, and 134 may implement different queue management or congestion control techniques for managing data packets that are received and stored within the data buffers. Such techniques may utilize one or more scheduling algorithms for controlling access to target system resources. Examples of such scheduling algorithms include, but are not limited to, Byte Queue Limits (BQL), Random Early Detection (RED) and its variants (e.g., Weighted RED or WRED), and Controlled Delay (CoDel). The particular technique and/or scheduling algorithm that is used may depend on, for example, the type of operating system, application, and/or data flows associated with target devices 130, 132, and 134.

Data flow diagram 100A of FIG. 1A shows an example of the distributed computing system in a healthy state, where each of target devices 130, 132, and 134 is operating in a default or normal load state with no data packet loss. As shown by data traffic flows 115A and 125A from each of source devices 110 and 120 to target device 132 in FIG. 1A, the data traffic flow between each source and target device may include a plurality of data flows or pathways. In an embodiment, the number of data flows between a source device and each target at any given time may be based on a predetermined operating level or load state of the particular target device. While a total of three data flows are shown between each of the source and target devices in FIG. 1A, it should be noted that embodiments of the present disclosure are not intended to be limited thereto and that there may be more or fewer data flows between each source device and target device, e.g., depending on the predetermined operating level or load state of a particular target device within the distributed computing system.

Figure 1B:
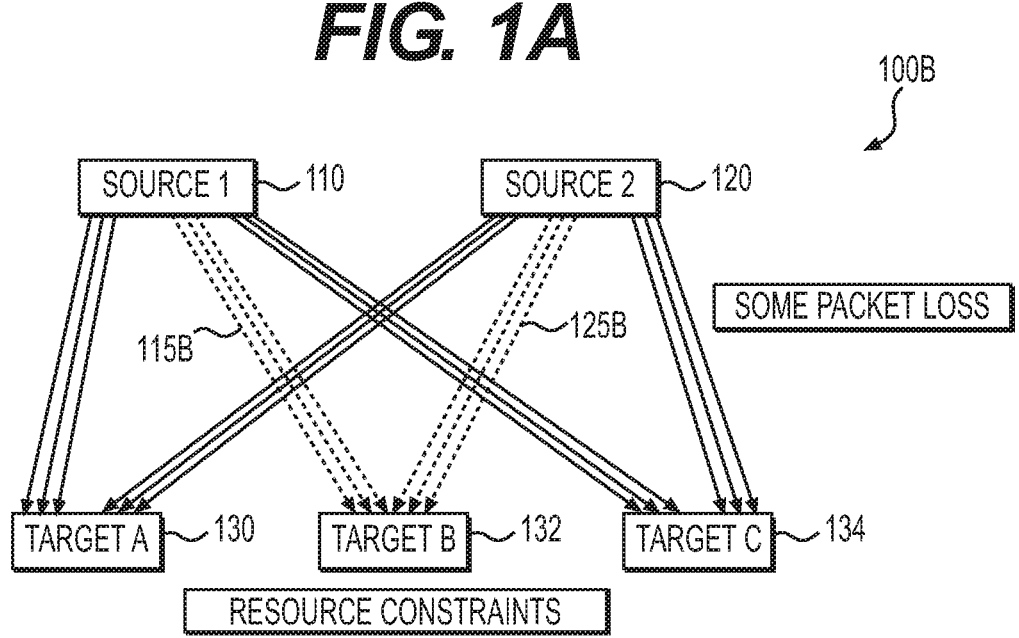
Figure 1C:
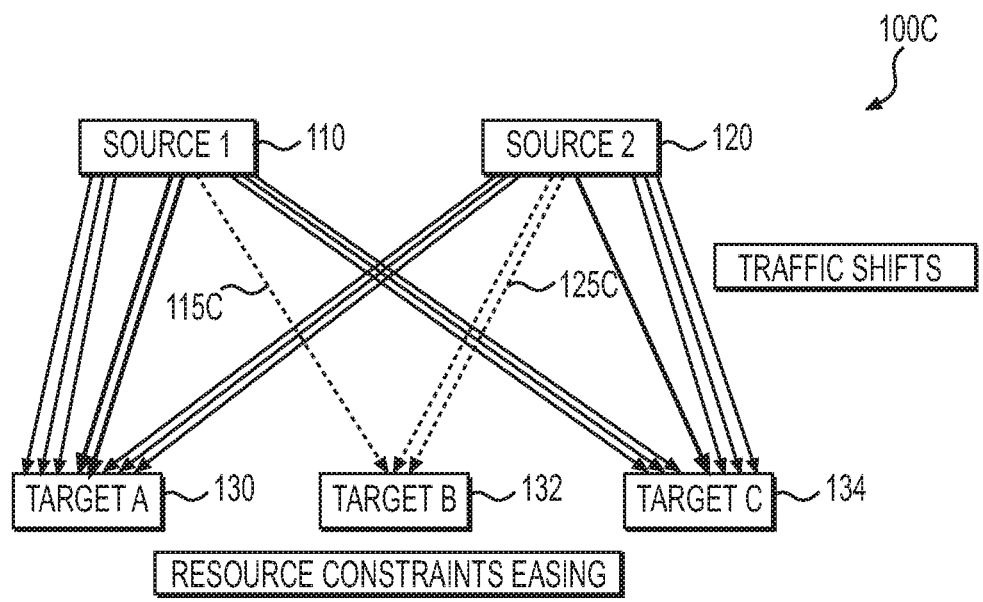
Figure 1D:
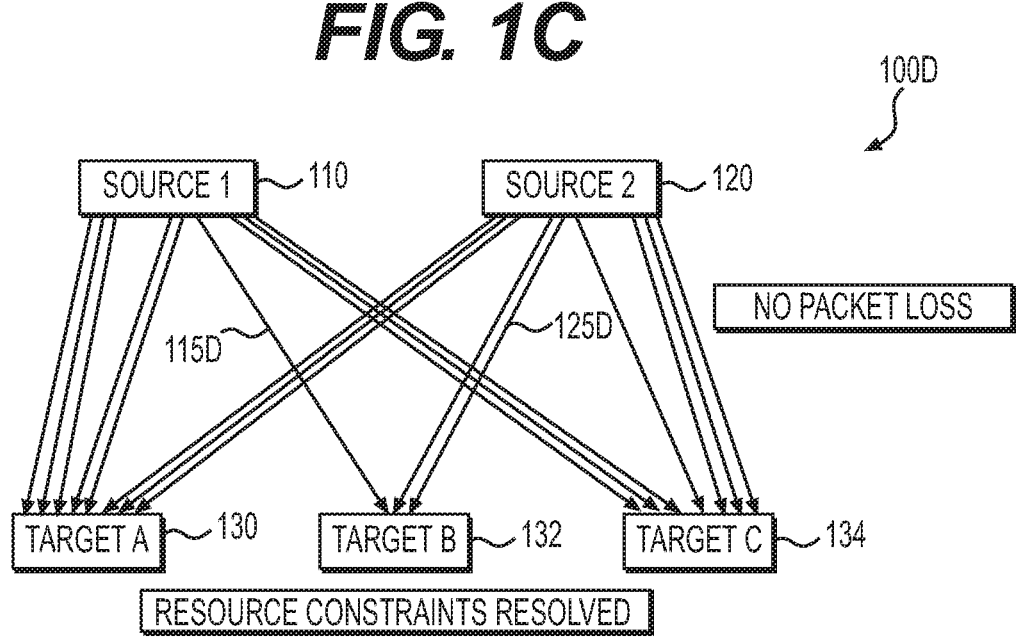

In the example shown by data flow diagram 100B of FIG. 1B, target device 132 may begin to drop packets due to a resource constraint while processing its current workload. As will be described in further detail below, the dropped packets may provide source devices 110 and 120 with an early indication of a resource constraint for target device 132. The constraint may be related to any one or combination of different computing resources of target device 132. Examples of such resources within each target device include, but are not limited to, central processing unit (CPU), memory, bandwidth, or input/output (I/O). Although each of target devices 130, 132, and 134 may have similar resources, the available capacity of each resource at any one of these devices may vary over time, i.e., depending on each device's load state or workload level at a given time.

Once target device 132 is determined to be operating under a resource constraint or in an unhealthy load state, a portion of the data traffic flows 115B and 125B between source devices 110 and 120, respectively, may be adjusted, e.g., by moving or shifting a part of each data traffic flow away from target device 132 to either target device 130 or 134. In addition to and/or alternatively, it may be possible to move or shift a part of or all of new data traffic flow away from target device 132 to either target device 130 or 134 once target device 132 is determined to be operating under a resource constraint or in an unhealthy load state. This is shown by data flow diagram 100C of FIG. 1C, where a data traffic flow 115C between source device 110 and target device 132 includes only one of the three data flows originating from source device 110, after the other two data flows are shifted to target device 130. Similarly, a data flow 125C between source device 120 and target device 132 includes only two of the three data flows originating from source device 120, after one of the data flows is shifted away to target device 134.

It should be noted that source devices 110 and 120 may independently monitor the respective data traffic flows to target device 132 and other target devices for purposes of detecting and resolving resource constraints across the target devices based on their corresponding load states. As described above, a constraint on any of a target device's resource may lead to increased network or processing delays in addition to loss of data packets. Thus, source devices 110 and 120 may detect resource constraints by monitoring the data traffic flow to each of target devices 130, 132, and 134 and tracking the transmission rate (or RTT) of data packets and/or packet loss rate (PLR) over time. Source devices 110 and 120 may also calculate performance measurements based on the tracked RTT and/or PLR of each target device in order to determine the target device's load state. In an example, the performance measurements may be continuously updated for each target device based on the monitored data traffic flow to that target device. Alternatively, the performance measurements may be calculated on a periodic basis.

In an embodiment, each source device may perform any of various actions to mitigate or resolve a resource constraint detected for a target device and return the target device to a healthy load state, in which packets are processed in a timely manner without any packet loss. Such actions may include, but are not limited to: (1) moving or reassigning all new traffic to other targets that are available and have sufficient capacity while continuing the existing data traffic flow to the resource-constrained target; (2) moving all new and existing traffic away from the target in question to other targets; (3) continuing to monitor the target in question and moving new or existing traffic away only when the load state of the target exceeds a predetermined maximum threshold; (4) moving or reallocating a portion of the new or existing traffic away from the target in question to other targets; and (5) moving a combination of new and existing traffic to other targets, e.g., by moving a portion of the existing traffic and reallocating a portion of the new traffic to be sent to the resource-constrained target device. The particular action performed may depend on various factors. Such factors may include, for example and without limitation, the extent of the data loss and/or network or processing delay, the type of communication protocol and queue management or congestion control techniques that may be used (e.g., TCP stacks including BQL, RED, WRED, CoDel, etc.), and the availability of other target devices within the distributed system.

By adjusting a portion of the data traffic flow away from target device 132, e.g., by shifting one or more individual data flows to either of target devices 130 or 134, target device 132 may be placed in a reduced load state. As illustrated by data flow diagram 100D of FIG. 1D, operation in such a reduced load state according to the adjusted data traffic flow allows target device 132 to recover from its resource constraints and return to a healthy load state with no packet loss. Once source devices 110 and 120 have determined that the resource constraints of target device 132 have been resolved and that the functional capacity of target device 132 has been restored, e.g., to at least some predetermined level of operation, each source device may choose to readjust the data traffic flow to target device 132. In an example, this may involve allocating or moving new or existing data flows to target device 132 in order to restore the load state of target device 132 to a default or predetermined standard operating level.

Figure 1E:
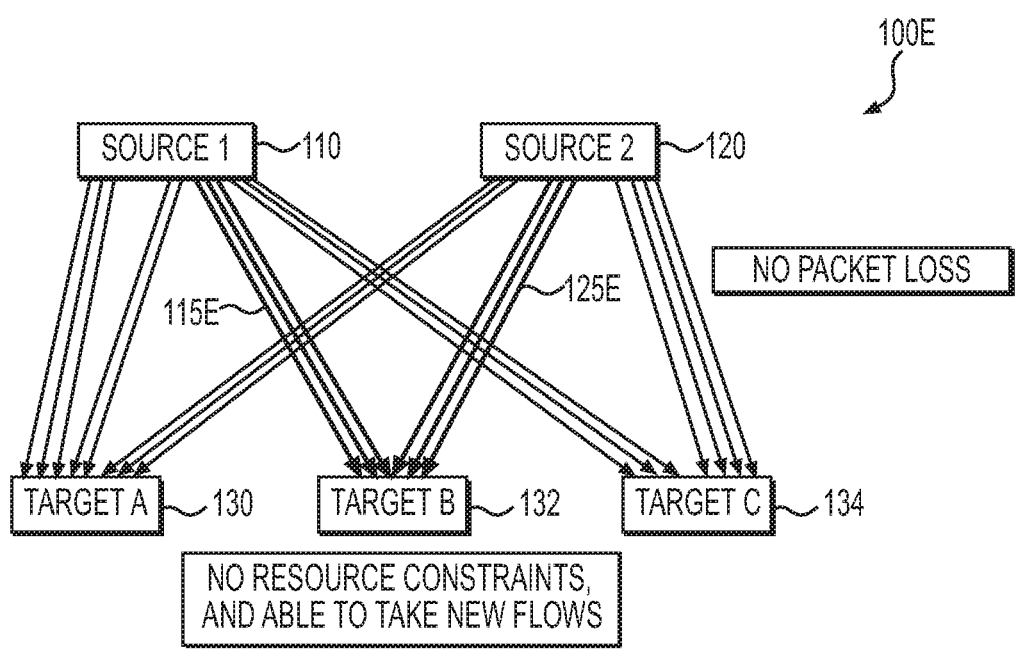

In the example shown by data flow diagram 100E of FIG. 1E, readjusted data traffic flows 115E and 125E between target device 132 and each of source devices 110 and 120 include new data flows that replace the data flows that were previously shifted to target devices 130 and 134. While data traffic flows 115E and 125E in this example are readjusted by adding new data flows, it should be noted that the techniques disclosed herein are not limited thereto and that data traffic flows 115E and 125E between source device 110 or 120 and target device 132 may also be readjusted by shifting one or more existing data flows away from either target device 130 or 134. The data traffic flows may be readjusted by, for example, moving back the existing data flows that were previously shifted away from target device 132, as described above with respect to data flow diagram 100C of FIG. 1C.

Figure 2:
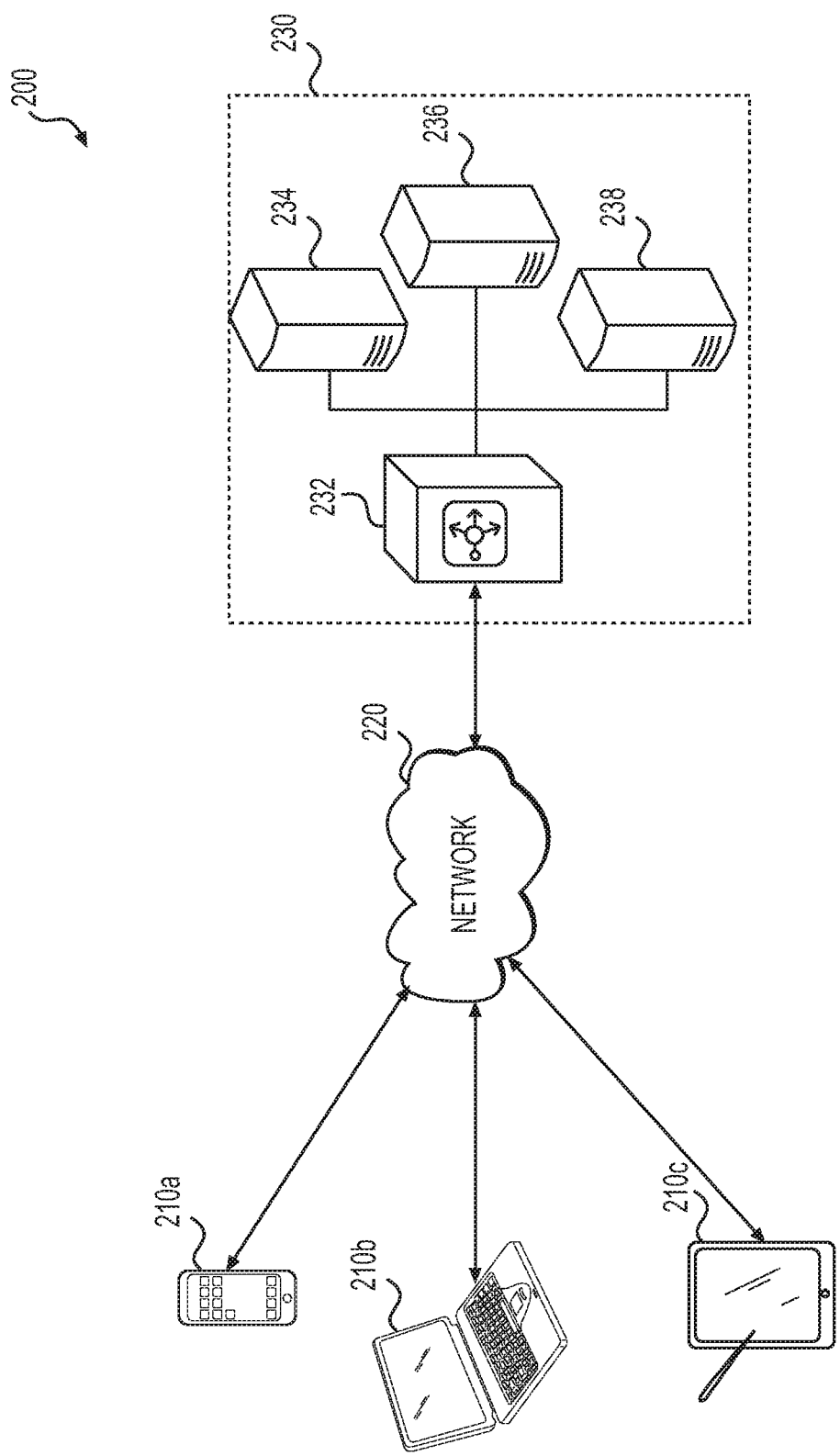
FIG. 2 is a block diagram of an exemplary distributed client-server system suitable for practicing embodiments of the present disclosure.

FIG. 2 is a block diagram of an exemplary distributed client-server system 200 suitable for practicing embodiments of the present disclosure. As shown in FIG. 2, system 200 includes client devices 210a, 210b, and 210c, each of which are communicatively coupled to a data center 230 via an electronic network 220. Network 220 may be any type of communication network or combination of networks used for exchanging electronic information between various computing devices. Network 220 may include, for example, a local area network, a medium area network, or a wide area network, such as the Internet. Additionally, network 220 may be a virtual network of VMs in a virtual system environment.

In the example shown in FIG. 2, user device 210a may be, for example, a laptop or similar type of mobile personal computer, mobile device 210b may be, for example, a tablet computer or similar type of mobile computing device having a touchscreen display, and mobile device 210c may be, for example, a mobile handset, smartphone, PDA, or similar type of device. However, it should be noted that user devices 210a, 210b, and 210c are not intended to be limited to the types of computing devices depicted in FIG. 2 and that each of client devices 210a, 210b, and 210c may be implemented using any type of computing device configured to send and receive different types of electronic information to and from various computing devices via network 220. Such information may include, for example and without limitation, text, graphics and multimedia content (including images, video, and/or audio files). Such content may be associated with, for example, a website that may be used to access the functionality of a web service through a web browser executable at each of client devices 210a, 210b, and 210c. Alternatively, such content may be loaded and displayed within a dedicated or standalone client application associated with the web service and executable at each of client devices 210a, 210b, and 210c.

Examples of different types of computing devices that may be used to implement any of user devices 210a, 210b, and 210c include, but are not limited to, a desktop computer or workstation, a laptop computer, a mobile handset, a personal digital assistant (PDA), a cellular telephone, a network appliance, a camera, a smart phone, an enhanced general packet radio service (EGPRS) mobile phone, a media player, a navigation device, a game console, a set-top box, or any combination of these or other types of computing devices having at least one processor, a local memory, a display (e.g., a monitor or touchscreen display), one or more user input devices, and a network communication interface. The user input device(s) may include any type or combination of input/output devices, such as a keyboard, touchpad, mouse, touchscreen, camera, and/or microphone.

Also, as shown in the example of FIG. 2, data center 230 may be a distributed computing system including a load balancer 232 and "back-end" servers 234, 236, and 238. Referring back to FIGS. 1A-1E, load balancer 232 may be used to implement, for example, source device 110 or 120. Similarly, servers 234, 236, and 238 may be used to implement target devices 130, 132, and 134, respectively. Load balancer 232 and servers 234, 236, and 238 may be communicatively coupled to one another via a private network behind a firewall (not shown). Such a private network may be associated with an enterprise or online service provider. The private network may be, for example, a medium area or wide area network, and each of load balancer 232 and servers 234, 236, and 238 may be in separate geographic locations.

Each of load balancer 232 and back-end servers 234, 236, and 238 may be implemented using any of various types of servers including, for example and without limitation, a web server or an application server. However, it should be noted that each of load balancer 232 and servers 234, 236, and 238 may be implemented using any general-purpose computer capable of serving data to other computing devices including, but not limited to, user devices 210a, 210b, 210c or any other computing device (not shown) via network 220. Such a general-purpose computer typically has at least one processor and memory for executing and storing instructions. The memory may include any type of random access memory (RAM) or read-only memory (ROM) embodied in a physical storage medium, such as magnetic storage including floppy disk, hard disk, or magnetic tape; semiconductor storage such as solid state disk (SSD) or flash memory; optical disc storage; or magneto-optical disc storage. Software may include one or more applications and an operating system. Hardware may also include an output device, e.g., a display device coupled thereto, for displaying relevant information to a user and a user input device, e.g., a mouse, keyboard, or touchscreen display, for receiving input from the user.

In some embodiments, data center 230, including load balancer 232 and servers 234, 236, and 238, may be implemented as a clustered computing environment or server farm using multiple servers or general purpose computing devices having multiple processors and multiple shared or separate memory devices. While not shown in FIG. 2, data center 230 may also include one or more databases or data storage devices (not shown). Such data storage devices may be used to store any type of data or content accessible by the various computing devices of data center 230, including load balancer 232 and servers 234, 236, and 238.

Also, while only mobile devices 210*a*, 210*b* and 210*c* are shown in FIG. 2, system 200 may include any number of user devices (e.g., each associated with one of many hundreds, thousands, or millions of users), all of which may be communicatively coupled via network 220. Likewise, while only load balancer 232 and servers 234, 236, and 238 are shown in FIG. 2, system 200 may include any number of load balancers and/or back-end servers, as desired for a particular implementation.

In an example, data center 230 may be used by an online service provider to host a web application or service via network 220. A user at each of client devices 210*a*, 210*b*, and 210*c* may access the functionality provided by the web service through a web browser or client application executable at each device. As will be described in further detail below, each of client devices 210*a*, 210*b*, and 210*c* may generate multiple requests to the web service hosted at data center 230 in response to user input at each client device. The requests may be received and processed by data center 230. Load balancer 232 may manage the workload of data center 230 by receiving incoming client requests from client devices 210*a*, 210*b*, and 210*c* via network 220 and distributing to back-end servers 234, 236, and 238 the various tasks that need to be performed for processing each request. Additional features and characteristics of data center 230, including load balancer 232 and back-end servers 234, 236, and 238 will be described in further detail below with respect to FIG. 3.

Figure 3:
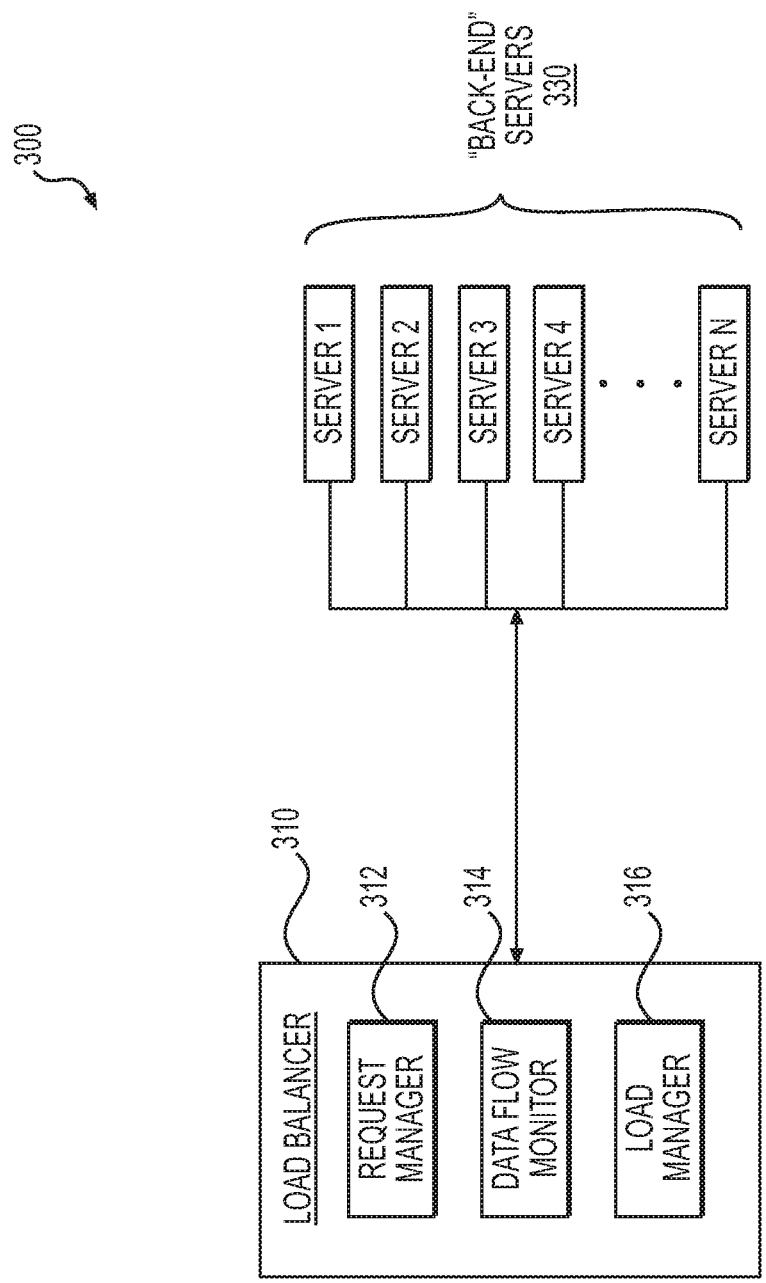
FIG. 3 is a block diagram of an exemplary data processing center of the client-server system of FIG. 2.

FIG. 3 is a block diagram of an exemplary distributed computing system 300. As shown in FIG. 3, system 300 includes a load balancer 310 and a group of back-end servers 330. The group of back-end servers 330 may include any number of servers as desired for a particular implementation. System 300 may be implemented using, for example, data center 230 of FIG. 2, as described above. Accordingly, load balancer 310 may be implemented using load balancer 232, and back-end servers 330 may be implemented using back-end servers 234, 236, and 238 of FIG. 2, as described above. However, it should be noted that system 300 is not intended to be limited to data center 230 or system 200 of FIG. 2.

As shown in FIG. 3, load balancer 310 includes a request manager 312, a data flow monitor 314, and a load manager 316. It should be noted that load balancer 310 may include additional components, which are not shown in FIG. 3 for ease of discussion. In an embodiment, request manager 312 may receive requests from one or more client devices (e.g., client devices 210*a*, 210*b*, or 210*c* of FIG. 2, as described above) over a network (e.g., network 220 of FIG. 2). Request manager 312 may then process each request into individual tasks or load units. The tasks or load units may be in the form of data packets that may be distributed using load manager 316 to one or more of back-end servers 330 for processing. In an embodiment, the load units or data packets may be distributed through one or more data flows in the form of communication links or data pathways established between load balancer 310 and each back-end servers 330.

In an embodiment, data monitor 314 may monitor the data traffic flow between load balancer 310 and each of the back-end servers 330. The monitored data traffic flow may then be used by data monitor 314 to determine a load state of each server. In an example, data monitor 314 may maintain various performance metrics based on the monitored data flow. Such performance metrics may include, but are not limited to, a network latency time and a data packet loss rate. In an embodiment, the network latency time may be a round-trip time (e.g., an average or maximum RTT) of data packets exchanged between load balancer 310 and each of the servers 330. The performance metrics may be used to calculate a set of performance measurements indicating a health of the load state of each of the servers 330.

Figure 4:
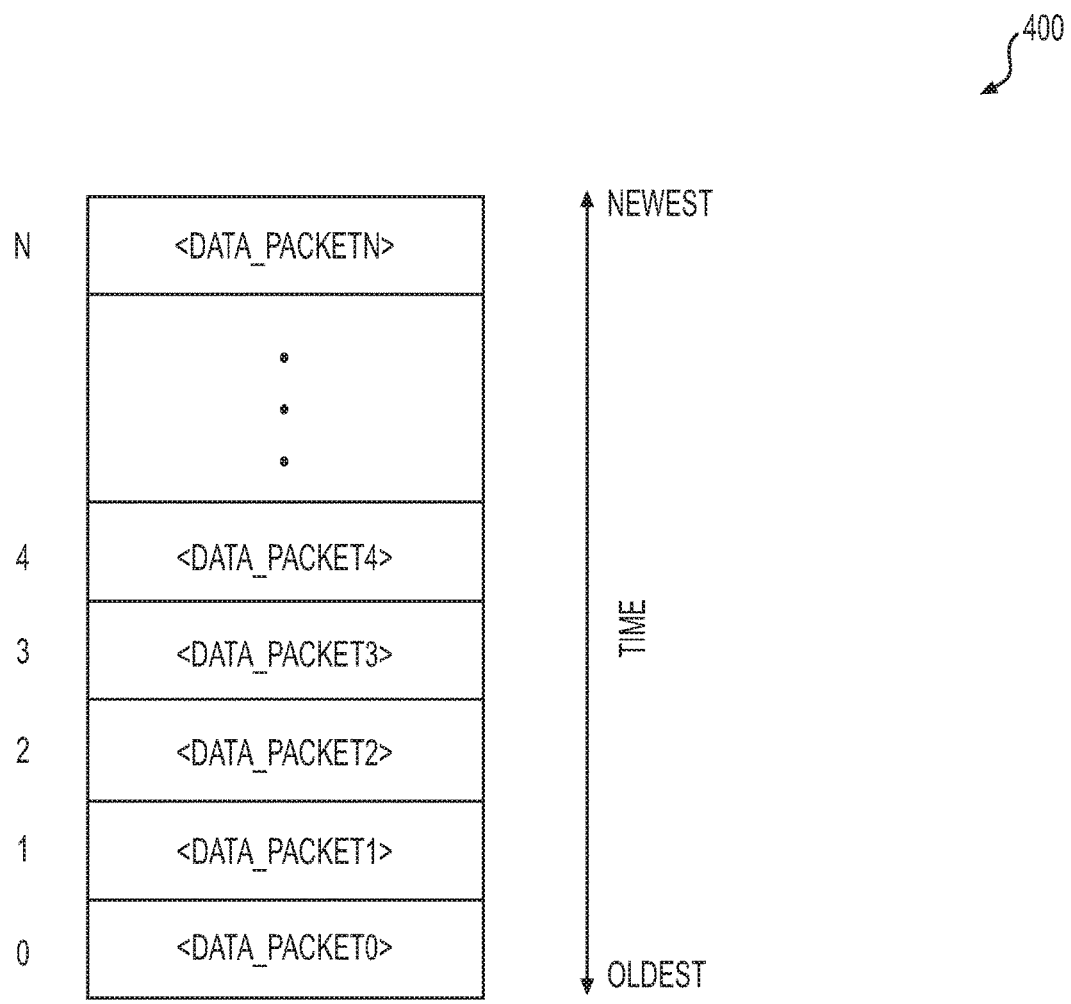
FIG. 4 is an exemplary data buffer for temporarily storing data packets received at a target device within the data center of FIGS. 2 and 3.

In an embodiment, each of the servers 330 includes a data buffer for temporarily storing data packets received from load balancer 310 prior to processing. FIG. 4 shows an example of such a data buffer. As shown in FIG. 4, the data packets may be stored as a queue, where each packet is processed on a first-in-first-out (FIFO) basis. Thus, the starting position or head of the queue corresponds to the earliest of the data packets received from a source device (e.g., load balancer 310) and stored within the data buffer queue. Referring back to system 300 of FIG. 3, each of servers 330 may be configured to automatically drop or remove the oldest data packet from the data buffer, i.e., the data packet corresponding to the starting position or head of the data buffer's queue, after a predetermined time period has elapsed.

In an embodiment, data flow monitor 314 may detect a resource constraint for one of the servers 330, based on its corresponding load state. Data flow monitor 314 may then notify load manager 316 of the resource-constrained server. Load manager 316 may then adjust at least a portion of the data traffic flow to the server in question such that this server may operate at a reduced load state. This may involve, for example, diverting one or more new or existing data flows away from the resource-constrained server to one or more other servers that may be available and have sufficient capacity to handle the additional workload, as described above with respect to the example illustrated in FIGS. 1A-1E.

Data flow monitor 314 may continue monitoring the adjusted data traffic flow to the resource-constrained server while it operates at the reduced load state. If data monitor 314 later determines that this server no longer has the resource constraint or is healthy enough to handle additional workload, it may notify load manager 316 and load manager 316 may readjust the data traffic flow between load balancer 310 and the server in question so as to restore the load state of this server to a default or predetermined operating level that is above the reduced load state.

Additional operations that may be performed by each of servers 330 and load balancer 310 will be described in further detail below with respect to method 500 of FIG. 5 and method 600 of FIG. 6, respectively.

Figure 5:
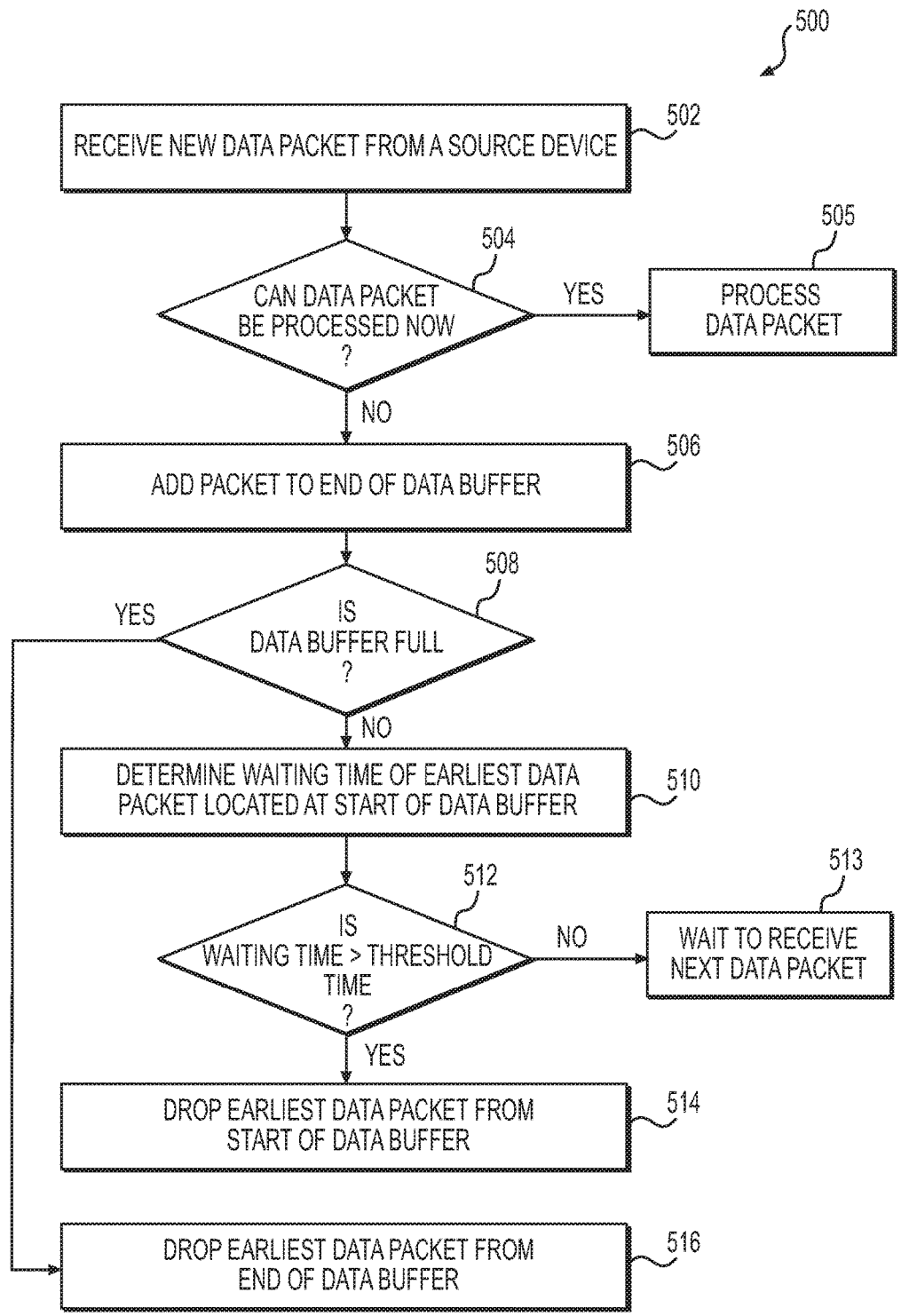
FIG. 5 is a process flowchart of an exemplary method for signaling a resource constraint by a target device using a head-drop buffer control scheme.

FIG. 5 is a process flowchart of an exemplary method 500 for signaling a resource constraint by a target device using a head-drop buffer control scheme. Method 500 may include steps 502, 504, 506, 508, 510, 512, and 514. For purposes of discussion, method 500 will be described using systems 200 and 300 of FIGS. 2 and 3, respectively, as described above. However, method 500 is not intended to be limited thereto. In an example, the steps of method 500 may be performed by each of back-end servers (or target devices) 330 of FIG. 3, as described above. Also, as described above, such back-end servers or target devices may be part of a data center or distributed computing system that may be used to provide the functionality of a web service to various clients (e.g., client devices 210*a*, 210*b* and 210*c* of FIG. 2, as described above).

Method 500 begins in step 502, which includes receiving a new data packet from a source device (e.g., load balancer 232 of FIG. 2 or load balancer 310 of FIG. 3, as described above). In step 504, it is determined whether the received data packet can be processed at the time of receipt. For example, if no previously received data packets are currently being processed, method 500 may proceed to step 505 and the received data packet may be scheduled to be processed. Otherwise, method 500 proceeds to step 506 and the data packet is added to the end of a waiting queue within a data buffer or memory used to temporarily store data packets prior to being scheduled for processing. The data buffer may be of any size, e.g., as desired for a particular implementation.

As described above, a data packet stored within the data buffer may be dropped or removed from the end of the data buffer (step 516) if the buffer is determined to be full (step 508) or a data packet stored within the data buffer may be dropped or removed from the start of the data buffer (step 514) after a predetermined period of time has elapsed (step 512) since the particular data packet was received and stored within the buffer. Accordingly, if the data buffer is determined not to be full in step 508, method 500 proceeds to step 510, which includes determining a waiting time of the oldest or earliest received data packet in the data buffer queue. In some implementations, a timestamp may be associated with each data packet as it is received and stored in the queue. As data packets are stored in sequential order as they are received, the oldest data packet (e.g., with the earliest timestamp) corresponds to the packet in the head or starting position of the queue. Accordingly, the waiting time of the earliest data packet may be determined in step 510 based on the difference between the current time and the timestamp associated with the data packet at the head of the queue.

If it is determined in step 512 that the waiting time of the earliest data packet exceeds a predetermined threshold waiting time, method 500 proceeds to step 514, in which the packet is dropped from the queue. Otherwise, method 500 proceeds to step 513, which includes waiting to receive the next data packet to be processed or added to the data buffer queue. The threshold waiting time in step 512 may be selected based on, for example, the particular characteristics of the application or web service and/or the hardware and/or software characteristics of the target device (or back-end server). Such characteristics of the target device may affect, for example, the device's potential workload capacity during normal operation. For example, a relatively lower threshold waiting time may be set for a target device having a relatively higher workload capacity.

Figure 6:
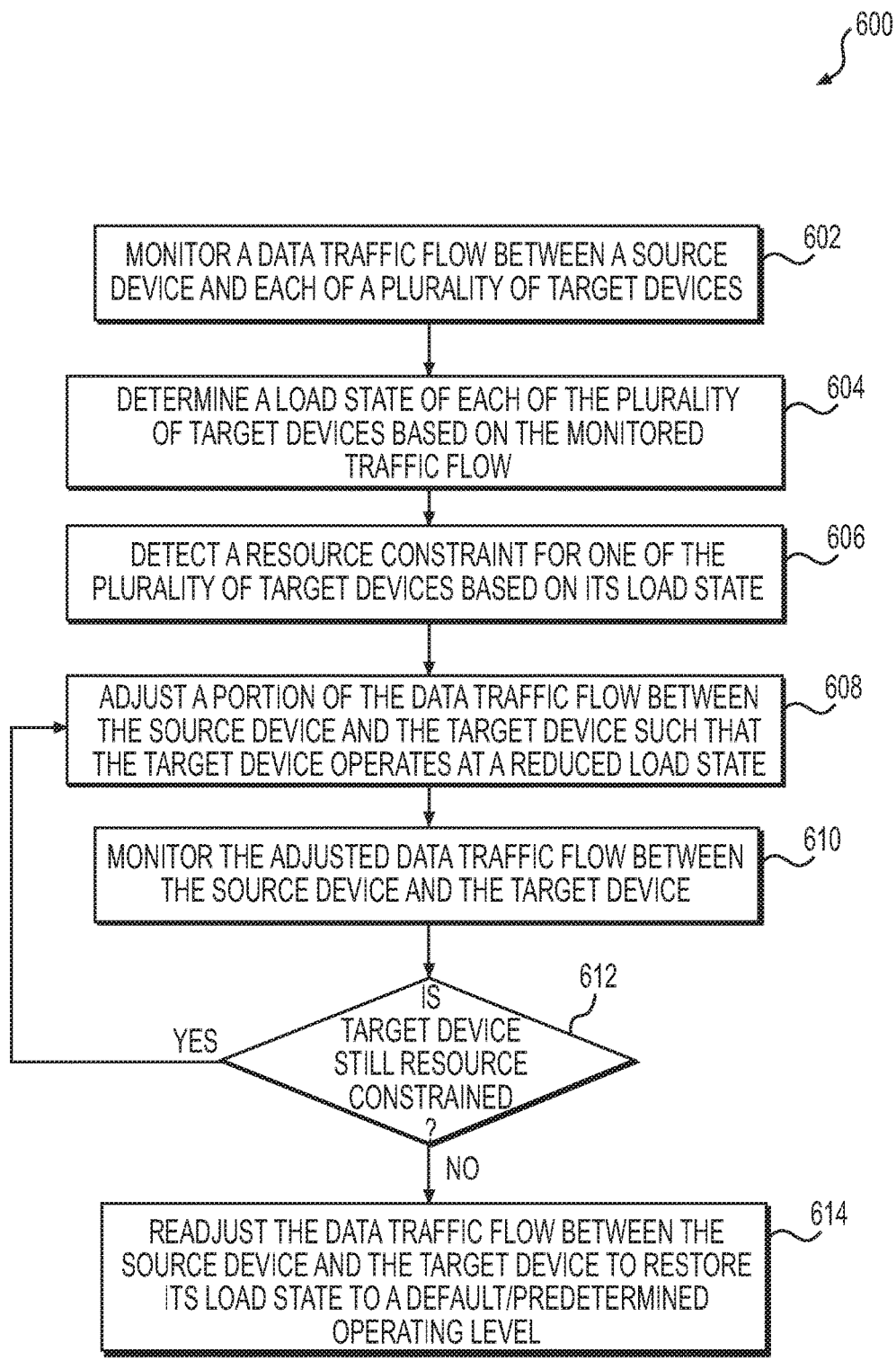
FIG. 6 is a process flowchart of an exemplary method for managing network data traffic flows from a source device to a plurality of target devices.

FIG. 6 is a process flowchart of an exemplary method 600 for managing network data traffic flows between a source device (or load balancer) and a plurality of target devices. Method 600 may include steps 602, 604, 606, 608, 610, 612, and 614. Like method 500 of FIG. 5, method 600 will be described using systems 200 and 300 of FIGS. 2 and 3, respectively, solely for purposes of discussion and is not intended to be limited thereto. The steps of method 600 may be performed by, for example, load balancer 232 or load balancer 310 of FIG. 3, as described above. Also, as described above, the load balancer or source device in this example may be part of a data center or distributed computing system that may be used to provide the functionality of a web service to various clients (e.g., client devices 210*a*, 210*b* and 210*c* of FIG. 2, as described above).

Method 600 begins in step 602, which includes monitoring a data traffic flow between a source device (e.g., load balancer 232 of FIG. 2, as described above) and each of a plurality of target devices (e.g., back-end servers 234, 236, and 238 of FIG. 2) via a network (e.g., network 220 of FIG. 2). Method 600 then proceeds to step 604, in which a load state of each of the plurality of target devices is determined based on the monitored data traffic flow in step 602. Step 604 may include determining a network latency time and a packet loss rate for each of the plurality of target devices, based on the monitored data traffic flow between the source device and each target device. As described above, such network latency time and packet loss rate metrics may be used to calculate a set of performance measurements indicating a health of the load state of each of the plurality of target devices. In an example, the network latency time may be a round-trip time (e.g., an average or maximum RTT) of data packet signals exchanged between the source device and each of the plurality of target devices.

In step 606, a resource constraint for at least one of the plurality of target devices may be detected based on the load state determined for the target device in question. In an example, a resource constraint may be detected based on the performance measurements calculated for each target device, as described above. In a further example, the resource constraint of a target device may be detected when the network latency time or the packet loss rate determined for the first target device exceed a predetermined threshold value In step 608, at least a portion of the data traffic flow between the source device and the target device in question may be adjusted so as to reduce the current load state of the target device and resolve the detected resource constraint. In an embodiment, the data traffic flow is adjusted such that this target device operates at a reduced load state. The reduced load state may be, for example, any operating state of the target device below a default or predetermined operating level at which the device is to operate under normal operating conditions. As described above, such a default operating level may be determined for a particular target device based on hardware and/or software characteristics of the target device and/or application or web service that it is being used to support.

In an embodiment, the data traffic flow is adjusted by diverting at least a portion of the data traffic flow away from the resource-constrained target device to at least one other target device selected from among the plurality of target devices. For example, a second target device may be selected to receive the diverted portion of the data traffic flow from the first target device based on the load state of the second target device relative to that of other target devices remaining in the plurality of target devices. The load state of each target device may be used, for example, to determine the available capacity of the particular target device and the amount of additional workload, if any, that the device may be able to handle.

In an embodiment, the data traffic flow between the source device and each target device may include a plurality of data flows. Thus, adjusting or diverting a portion of the data traffic flow may include selecting one or more of the plurality of data flows to be moved away from the first target device, and moving the selected data flow(s) away from the resource-constrained target device to one or more other target devices selected from among the plurality of target devices. The other target devices may be selected based on, for example, their respective load states relative to the remaining target devices. For example, the selected target devices may be those that have been determined to have the lowest or lightest load states and therefore the greatest available capacity for handling additional workload.

Method 600 then proceeds to step 610, in which the adjusted (or reduced) data traffic flow between the source device and the target device is monitored. Any one of various techniques may be used to monitor the new data traffic flow and/or health of the first target device that was determined to have the resource constraint. Examples of such monitoring techniques include, but are not limited to, in-band polling or monitoring, out-of band polling/monitoring, and traffic flow monitoring. Alternatively, the load state of the first target device in this example may be returned to a default operating level after a predetermined amount of time has elapsed. For example, a timer may be used to automatically trigger state changes, e.g., between reduced and default operating states. In a different example, such state changes for the first target device may be made manually by a user, e.g., a system administrator.

Next, the monitored data traffic flow following the adjustment may be used in step 612 to determine whether or not the resource constraint has been resolved. If it is determined in step 612 that the target device no longer has the resource constraint while operating at the reduced load state, method 600 proceeds to step 614, in which the data traffic flow between the source device and this target device is readjusted so as to restore the load state of the target device to a default or predetermined operating level that is above the reduced load state. If it is determined in step 612 that the target device has the resource constraint while operating at the reduced load state, method 600 proceeds to step 608, in which a portion of the data traffic flow between the source device and the target device is adjusted such that the target device operates at a further reduced load state.

The examples described above with respect to FIGS. 1-6, or any part(s) or function(s) thereof, may be implemented using hardware, software modules, firmware, tangible computer readable media having instructions stored thereon, or a combination thereof and may be implemented in one or more computer systems or other processing systems.

Figure 7:
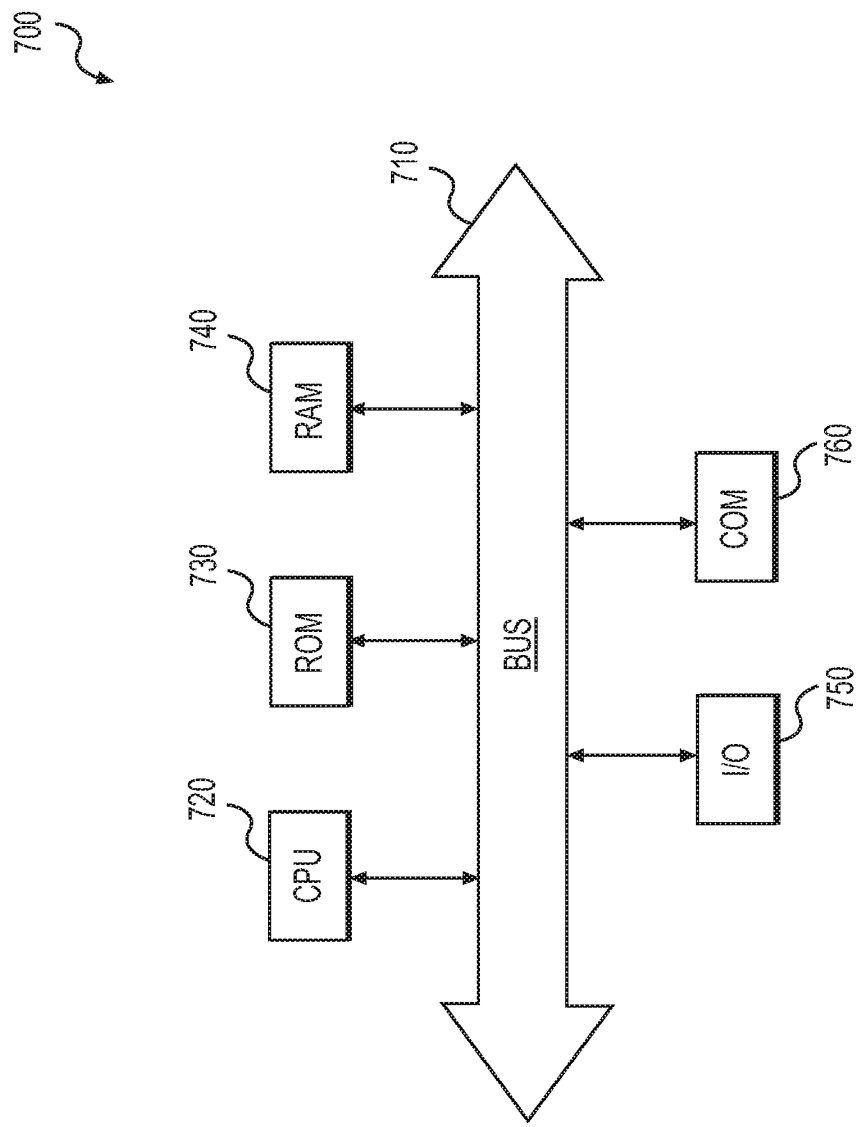
FIG. 7 is a block diagram of an exemplary computer system in which embodiments of the present disclosure may be implemented.

FIG. 7 illustrates a high-level functional block diagram of an exemplary computer system 700, in which embodiments of the present disclosure, or portions thereof, may be implemented, e.g., as computer-readable code. For example, each of the exemplary devices and systems described above with respect to FIGS. 2 and 3 can be implemented in computer system 700 using hardware, software, firmware, tangible computer readable media having instructions stored thereon, or a combination thereof and may be implemented in one or more computer systems or other processing systems. Hardware, software, or any combination of such may embody any of the modules and components in FIGS. 2 and 3.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the present disclosure, as described above in the examples of FIGS. 1-6 may be implemented using computer system 700. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 7, computer system 700 includes a central processing unit (CPU) 720. CPU 720 may be any type of processor device including, for example, any type of special purpose or a general purpose microprocessor device. As will be appreciated by persons skilled in the relevant art, CPU 720 also may be a single processor in a multi-core/multiprocessor system, such system operating alone, or in a cluster of computing devices operating in a cluster or server farm. CPU 720 is connected to a data communication infrastructure 710, for example, a bus, message queue, network, or multi-core message-passing scheme.

Computer system 700 also includes a main memory 740, for example, random access memory (RAM), and may also include a secondary memory 730. Secondary memory 730, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc. which is read by and written to by the removable storage drive. As will be appreciated by persons skilled in the relevant art, such a removable storage unit generally includes a computer usable storage medium having stored therein computer software and/or data.

In alternative implementations, secondary memory 730 may include other similar means for allowing computer programs or other instructions to be loaded into computer system 700. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to computer system 700.

Computer system 700 may also include a communications interface ("COM") 760. Communications interface 760 allows software and data to be transferred between computer system 700 and external devices. Communications interface 760 may include a modem, a network interface (such as an Ethernet card), a communications port, a PCMCIA slot and card, or the like. Software and data transferred via communications interface 760 may be in the form of signals, which may be electronic, electromagnetic, optical, or other signals capable of being received by communications interface 760. These signals may be provided to communications interface 760 via a communications path of computer system 700, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Computer system 700 also may include input and output ports 750 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

It would also be apparent to one of skill in the relevant art that the present disclosure, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, this disclosure is not to be considered as limited by the foregoing description.

The breadth and scope of the present disclosure should not be limited by any of the above-described exemplary embodiments, but should be defined only in accordance with the following claims and their equivalents.

What is claimed is:

1. A computer-implemented method for managing workloads across multiple resources in a distributed computing system, the method comprising:
    monitoring a data traffic flow between a source device and each of a plurality of target devices via a network, wherein each of the plurality of target devices includes a linear data buffer for temporarily storing data packets received from the source device prior to processing;
    detecting a resource constraint for a first target device in the plurality of target devices;
    adjusting at least a portion of the data traffic flow between the source device and the first target device such that the first target device operates at a reduced load state; and
    upon determining that the first target device no longer has the resource constraint while operating at the reduced load state, readjusting the data traffic flow between the source device and the first target device so as to restore the load state of the first target device to a predetermined operating level that is above the reduced load state.

2. The method of claim 1, wherein determining a load state for each of the plurality of target devices further comprises:
    determining a network latency time and a packet loss rate for each of the plurality of target devices, based on the monitored data traffic flow between the source device and each target device; and
    calculating a set of performance measurements indicating a health of the load state of each of the plurality of target devices, based on the corresponding network latency time and packet loss rate determinations.

3. The method of claim 2, wherein the network latency time is a round-trip time of data packet signals exchanged between the source device and each of the plurality of target devices.

4. The method of claim 2, wherein the resource constraint of the first target device is detected when the network latency time or the packet loss rate determined for the first target device exceed a predetermined threshold value.

5. The method of claim 2, wherein determining the packet loss rate for each of the plurality of target devices, based on the monitored data traffic flow between the source device and each target device includes:
    determining whether the respective target device has automatically dropped a data packet selected from a starting position of the linear data buffer.

6. The method of claim 1, wherein adjusting at least a portion of the data traffic flow between the source device and the first target device comprises:
    diverting at least a portion of the data traffic flow away from the first target device to a second target device that is selected from among the plurality of target devices based on the load state of the second target device relative to that of other target devices remaining in the plurality of target devices; and
    monitoring the adjusted data traffic flow between the source device and the first target device.

7. The method of claim 6, wherein the data traffic flow between the source device and the first target device includes a plurality of data flows, and diverting at least a portion of the data traffic flow to the first target device comprises:

selecting one or more of the plurality of data flows to be moved away from the first target device, based at least in part on the load state of the first target device; and moving the selected one or more data flows away from the first target device to at least one second target device that is selected from among the plurality of target devices based on the relative load state of each of the plurality of target devices.

8. The method of claim 7, wherein the plurality of data flows include existing data flows that were previously allocated to the first target device and new data flows to be allocated to the first target device, the selected one or more data flows are new data flows selected from the plurality of data flows, and adjusting at least a portion of the data traffic flow between the source device and the first target device comprises reallocating the new data flows that are selected to the second target device.

9. The method of claim 8, wherein the plurality of data flows include existing data flows that were previously allocated to the first target device and new data flows to be allocated to the first target device, the selected one or more data flows include a combination of existing data flows and new data flows selected from among the plurality of data flows, and adjusting at least a portion of the data traffic flow between the source device and the first target device comprises:

moving the existing data flows that are selected away from the first target device to the second target device; and reallocating the new data flows that are selected to the at least one second target device.

10. A system for balancing workloads across multiple resources in a distributed computing environment, the system comprising:

a memory having processor-readable instructions stored therein; and a processor configured to access the memory and execute the processor-readable instructions, which when executed by the processor configures the processor to perform a plurality of functions, including functions to:

monitor a data traffic flow between a source device and each of a plurality of target devices via a packet-switched network, wherein each of the plurality of target devices includes a linear data buffer for temporarily storing data packets received from the source device prior to processing;

detect a resource constraint for a first target device in the plurality of target devices;

adjust at least a portion of the data traffic flow between the source device and the first target device such that the first target device operates at a reduced load state;

determine that the first target device no longer has the resource constraint while operating at the reduced load state; and readjust the data traffic flow between the source device and the first target device so as to restore the load state of the first target device to a predetermined operating level that is above the reduced load state, based upon the determination.

11. The system of claim 10, wherein the processor is further configured to perform functions to:

determine a network latency time and a packet loss rate for each of the plurality of target devices, based on the monitored data traffic flow between the source device and each target device; and calculate a set of performance measurements indicating a health of the load state of each of the plurality of target devices, based on the corresponding network latency time and packet loss rate determinations.

12. The system of claim 11, wherein the network latency time is a round-trip time of data packet signals exchanged between the source device and each of the plurality of target devices.

13. The system of claim 11, wherein the resource constraint of the first target device is detected when the network latency time or the packet loss rate determined for the first target device exceed a predetermined threshold value.

14. The system of claim 10, wherein the function to adjust at least a portion of the data traffic flow includes functions to:

divert at least a portion of the data traffic flow away from the first target device to a second target device that is selected from among the plurality of target devices based on the load state of the second target device relative to that of other target devices remaining in the plurality of target devices; and monitor the adjusted data traffic flow between the source device and the first target device.

15. The system of claim 14, wherein the function to divert at least a portion of the data traffic flow includes functions to:

select one or more of the plurality of data flows to be moved away from the first target device, based at least in part on the load state of the first target device; and move the selected one or more data flows away from the first target device to at least one second target device that is selected from among the plurality of target devices based on the relative load state of each of the plurality of target devices.

16. The system of claim 10, wherein determining the packet loss rate for each of the plurality of target devices, based on the monitored data traffic flow between the source device and each target device includes:

determining whether the respective target device has automatically dropped a data packet selected from a starting position of the linear data buffer.

17. A non-transitory computer-readable medium storing instructions that, when executed by a computer, cause the computer to perform functions to:

monitor a data traffic flow between a source device and each of a plurality of target devices via a packet-switched network, wherein each of the plurality of target devices includes a linear data buffer for temporarily storing data packets received from the source device prior to processing;

detect a resource constraint for a first target device in the plurality of target devices;

adjust at least a portion of the data traffic flow between the source device and the first target device such that the first target device operates at a reduced load state;

determine that the first target device no longer has the resource constraint while operating at the reduced load state; and readjust the data traffic flow between the source device and the first target device so as to restore the load state of the first target device to a predetermined operating level that is above the reduced load state, based upon the determination.

18. The computer-readable medium of claim 17, wherein instructions that, when executed by a computer, cause the computer to perform functions to determine a load state for each of the plurality of target devices further comprises:

determine a network latency time and a packet loss rate for each of the plurality of target devices, based on the monitored data traffic flow between the source device and each target device; and calculate a set of performance measurements indicating a health of the load state of each of the plurality of target devices, based on the corresponding network latency time and packet loss rate determinations.

19. The computer-readable medium of claim 18, wherein instructions that, when executed by a computer, cause the computer to perform functions to determine the packet loss rate for each of the plurality of target devices, based on the monitored data traffic flow between the source device and each target device includes:

determining whether the respective target device has automatically dropped a data packet selected from a starting position of the linear data buffer.

* * * * *